United States Patent [19]
Frank et al.

[11] Patent Number: 5,461,696
[45] Date of Patent: Oct. 24, 1995

[54] DECISION DIRECTED ADAPTIVE NEURAL NETWORK

[75] Inventors: Mark S. Frank, Chandler; Sidney C. Garrison, III, Tempe, both of Ariz.

[73] Assignee: Motorola, Inc., Schaumburg, Ill.

[21] Appl. No.: 967,317

[22] Filed: Oct. 28, 1992

[51] Int. Cl.$^6$ .............................. G10L 7/08; G06F 15/18
[52] U.S. Cl. ...................... 395/2.41; 395/2.52; 395/2.61; 395/21
[58] Field of Search .................... 395/2, 2.65, 21, 395/23, 24, 2.11, 2.22, 2.41, 2.52

[56] References Cited

U.S. PATENT DOCUMENTS

| | | | |
|---|---|---|---|
| 5,065,040 | 11/1991 | Peterson et al. | 307/201 |
| 5,067,095 | 11/1991 | Peterson et al. | 395/24 |
| 5,220,640 | 6/1993 | Frank | 395/2 |
| 5,278,911 | 1/1994 | Bickerton | 381/43 |

OTHER PUBLICATIONS

Neurat Net Classifiers Useful for Speech Recognition Lippamann IEEE Jun. 21–24 1987.
Neural Nets for Computing Lippmann IEEE 11–14 Apr. 1988.
The Self–Organizing Map Kohonen Sep. 1990.
Application of Kohonen Self–Organizing Feature Maps to Smoothing Parameters of Hidden Markov Models for Speech Recognition Zhao et al. 18–20 Nov. 1991.
Kai–Fu Lee, Automatic Speech Recognition, Kluwer Academic Publishers, Boston, 1989.
Tekuya Koizumi, The Effect of Information Feedback on the Performance of a Phoneme Recognizer Using Kohen Map, Proceeding International Conference of Spoken Language Processing, Oct. 1992, Banff Alto, Canada.
T. Kohonen, Self Organization and Associative Memory, Chapter 5, published by Springer–Vertag, Berlin 1988.

Primary Examiner—Allen R. MacDonald
Assistant Examiner—Richemond Dorvil
Attorney, Agent, or Firm—Rennie William Dover; Harry A. Wolin

[57] ABSTRACT

A method for adapting a decision directed adaptive neural network (10). The method finds the best matches between a plurality of input data vectors (16) and an associated plurality of input portion of weight vectors. The input portion of the weight vectors are adapted. The identification codes (12) which represent the sequence of best matched weight vectors are stored in a memory (12) and the associated output portion of weight vectors (22) are output. A sequence of output portion of weight vectors (22) is matched with predetermined models (21). A sequence of labels (24) associated with the best matched model is stored which identifies the categories of match data. The labels (24) are sequentially combined with the identification codes (12) to build adaptation vectors. The adaptation vectors are then used to sequentially adapt the output portion of weight vectors (22).

8 Claims, 1 Drawing Sheet

DECISION DIRECTED ADAPTIVE NEURAL NETWORK

BACKGROUND OF THE INVENTION

The present invention relates, in general, to neural networks, and more particularly to adaptation of pretrained neural networks.

A neural network is essentially a pattern recognition apparatus. A common and complex application of such an apparatus is recognition of spoken words or commands. The fundamental challenges inherent in this process are outlined on pages 9 and 10 of "Automatic Speech Recognition", Kai-Fu Lee, published by Kluwer Academic Publishers, Boston, 1989, and which is incorporated herein by reference. The section sets forth four fundamental problems that must be overcome, including lack of learning and adaptation. In this context, lack of learning and adaptation refers to the acoustic properties both of the speaker and of the environment including the sound gathering system.

The prior art speech recognition systems include: hidden Markov models, pure neural network architectures, hybrid systems, and adaptive hybrid systems. Hidden Markov models (HMMs) are incapable of adapting to environmental conditions. Pure neural network architectures do not adequately represent the temporal nature of speech. Hybrid systems use both a neural network and an HMM, but do not use the adaptation properties of neural networks. Previous adaptive hybrid systems require complex training rules. None of these systems provide an easily trained system that can adapt to both the speaker and acoustic environment.

There is a need for a speech recognition system that can adapt to different speakers and changing environments. To be useful, the adaptation process must be both rapid and non-intrusive. The system should readily adapt to a variety of individuals as well as to various speech conditions experienced by those individuals. For example, the system should be able to work even though the speaker has a cold. Ideally the system should also address recognition problems which are analogous to speech recognition such as image recognition.

SUMMARY OF THE INVENTION

Briefly stated, the present invention provides a method for adapting a decision directed adaptive neural network. The method finds the best matches between a plurality of input data vectors and an associated plurality of input portions of weight vectors. The identification codes that represent the sequence of best matched input portions of weight vectors are stored in a memory and the associated output portions of weight vectors are output. A sequence of output portions of weight vectors are matched with predetermined models. The models generate a sequence of labels which are stored and which identify the categories of match data. The labels are sequentially combined with the identification code to build a plurality of adaptation vectors. The adaptation vectors are then used to sequentially adapt the output portion of weight vectors.

DETAILED DESCRIPTION OF THE DRAWINGS

Figure 1:
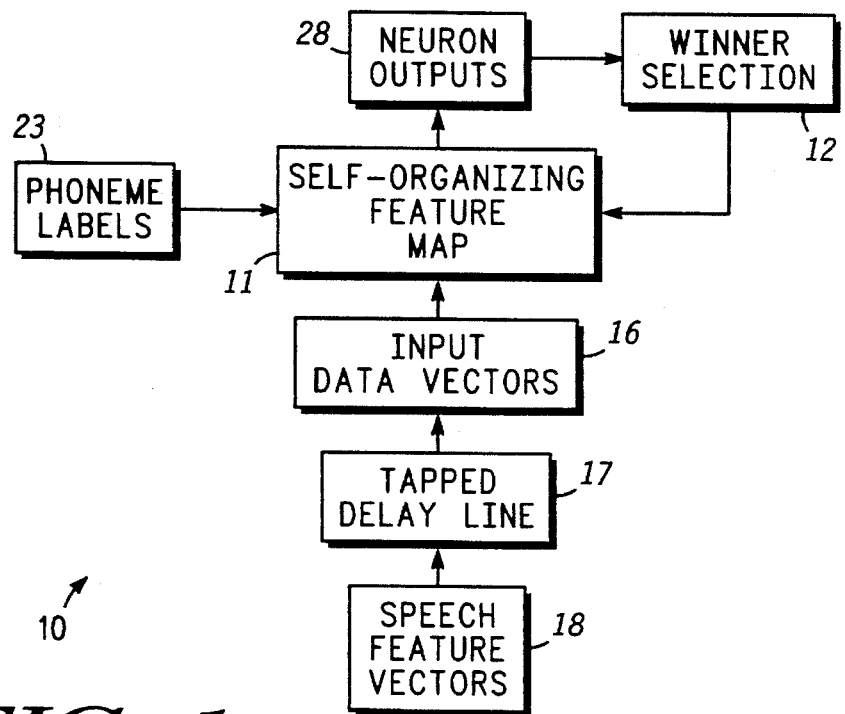
FIG. 1 shows a functional diagram of an adaptive speech recognizer as a preferred embodiment in accordance with the present invention configured in a factory training mode.

FIG. 1 shows a functional diagram of an adaptive speech recognizer 10 as a preferred embodiment in accordance with the present invention in a factory training mode.

The preferred training method is described in Chapter 5 of "Self-Organization and Associative Memory", Second Edition, T. Kohonen, published by Springer-Vertag, Berlin, 1988. This training method is applied in U.S. Pat. No. 5,065,040, "Reverse Flow Neuron", issued Nov. 12, 1991 to W. Peterson et al., which is incorporated herein by reference. The reverse flow neuron allows bi-directional signal transformations permitting highly efficient training of both an input portion and the associated output portion of weight vectors.

A plurality of speech feature vectors 18 is derived from raw speech in ways well known in the art. Typically speech feature vectors 18 comprise multiplication with a Hamming window, LPC analysis, cepstral recursion, zero crossing detection, peak-to-peak detection, and energy detection. Speech feature vectors 18 represent analysis of the characteristics of the input speech for a specific predetermined time. Speech feature vectors 18 are supplied to a tapped delay line 17 that stores present and past values of speech feature vectors 18. In this way, tapped delay line 17 supplies a context of recent history for the input phoneme. A set of input data vectors 16 are derived in a predetermined way from the value of each vector in tapped delay line 17. Input data vectors 16 are supplied to a self-organizing feature map 11 each with an associated phoneme label 23. The set of phoneme labels 23 and input data vectors 16 comprise matching sets of training data for training the winning neurons. A typical matched set, suited for training the preferred embodiment, is found in the well known "TIMIT" database. Self-organizing feature map 11 is typically a well known Kohonen feature map as described in the above reference.

Self-organizing feature map 11 performs two functions: calculating the similarity between each neuron's stored weight and input data vector 16 as well as updating each neuron's weight to better match input data vector 16 and phoneme label 23. A set of neuron outputs 28 is output from self-organizing feature map 11. Neuron outputs 28 comprise a vector that gives the values of the similarities of input data vector 16 to the input portion of weight vectors for each neuron contained in self-organizing feature map 11. A winner selection circuit 12 determines which neuron output 28 shows the best match. In training mode, winner selection circuit 12 allows the winning neurons to adjust their internal weights to achieve a better match to input data vector 16 and the matching phoneme label 23.

Figure 2:
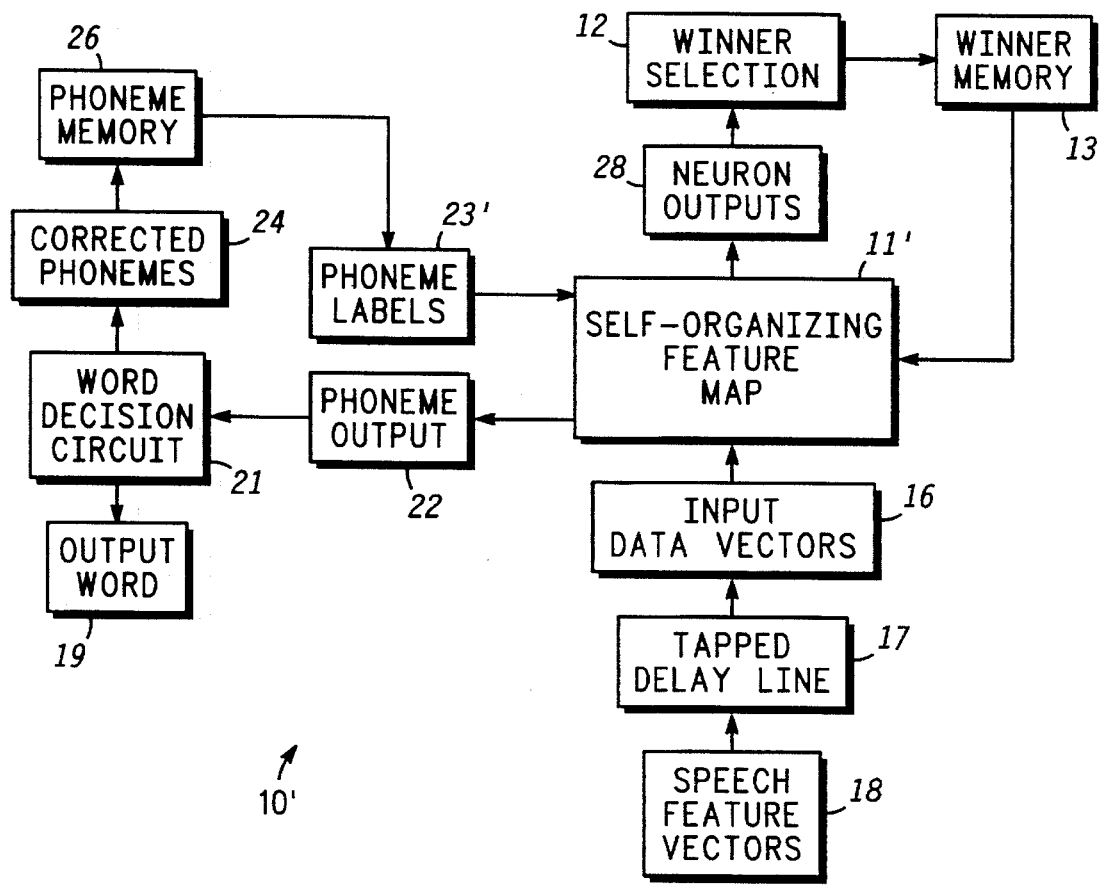
FIG. 2 shows a functional diagram of an adaptive speech recognizer as a preferred embodiment in accordance with the present invention configured in an adaptive operation mode.

FIG. 2 shows a functional diagram of an adaptive speech recognizer 10' as a preferred embodiment in accordance with the present invention in an adaptive operation mode. A self-organizing feature map 11' is similar to self-organizing feature map 11 (FIG. 1) except that a phoneme output 22 is generated for each input vector 16. In particular, the input portion of the best matching weight vector is adapted to the environment using a self-organizing map algorithm. Phoneme output 22 drives a word decision circuit 21 that generates the most probable word as an output word 19 based on a predetermined set of phoneme outputs 22. Typically word decision circuit 21 is a hidden Markov model (HMM). The algorithm used for word decision circuit 21 also outputs the most likely sequence of phonemes that could have generated this word as a set of corrected phonemes 24. Typically the algorithm to accomplish this task is the well-known Viterbi algorithm. Corrected phonemes 24 are stored in a phoneme memory 26 until completion of output word 19. At this point a phoneme label 23' is generated which is similar to phoneme label 23 (FIG. 1) except that the phonemes are dynamically derived from word decision circuit 21 rather than being a predetermined set of phoneme input vectors. Each frame is replayed set by set with the appropriate phoneme label and winning neuron to train the output portion of the weight vector of the winning neurons.

An alternative embodiment biases word decision circuit 21 with the correct word for an initial training step. In practice the system would prompt the user to say the desired word, for example "User please repeat the word seven".

By now it should be clear that the present invention provides a speech recognition system that can adapt to different speakers and to changing environments. The adaptation process is both rapid and non-intrusive. The system can also address pattern recognition problems that are analogs to speech recognition such as image and handwriting recognition.

We claim:

1. A method for adapting a decision directed adaptive neural network, comprising:

finding a best match between an input vector and an input portion of a weight vector to produce a best matching weight vector;

adapting an input portion of the best matching weight vector using a self-organizing map algorithm;

identifying the best matching weight vector with an identification code;

storing the identification code which represents the best matching weight vector;

outputting an output portion of the best matching weight vector;

sequentially repeating the steps of finding a best match between the input vector and the input portion of the weight vector, adapting an input portion, identifying the best matching weight vector, storing the identification code, and outputting the output portion of the best matching weight vector, for each element of a sequential plurality of input vectors;

matching a sequence of the output portion of each best matching weight vector with a set of predetermined models to select a best matching model;

outputting a sequence of labels which identify categories of input vectors in accordance with the best matching model;

storing the sequence of labels which identify the categories of input vectors;

sequentially combining each label of the sequence of labels with a corresponding identification code to build a plurality of adaptation vectors; and sequentially adapting the output portions of the best matching weight vectors with corresponding adaptation vectors of the plurality of adaptation vectors.

2. The method for adapting a decision directed adaptive neural network of claim 1 wherein the sequential plurality of input vectors represent pre-processed components of human speech.

3. The method for adapting a decision directed adaptive neural network of claim 1 wherein the output portion of the best matching weight vector represents phonemes drawn from a spoken language.

4. The method for adapting a decision directed adaptive neural network of claim 1 wherein the set of predetermined models represents words drawn from a spoken language.

5. The method for adapting a decision directed adaptive neural network of claim 1 wherein the set of predetermined models are hidden Markov models.

6. The method for adapting a decision directed adaptive neural network of claim 1, further comprising:

biasing selection of the set of predetermined models with a correctly matching model so as to facilitate training.

7. A decision directed adaptive neural network, comprising:

input means for detecting human speech;

a tapped delay line coupled to the input means;

a self-organizing feature map coupled to an output of the tapped delay line which produces a sequential set of output portions of weight vectors;

a winner location memory coupled to an output of the self-organizing feature map;

a word decision circuit coupled to the output of the self-organizing feature map;

a phoneme storage unit coupled to an output of the word decision circuit; and adapting means for altering the sequential set of output portions of the weight vectors based on the winner location memory and the phoneme storage unit.

8. A method for adapting a decision directed adaptive neural network, comprising:

pre-processing a speech pattern to determine a set of input vectors which comprises cepstral coefficients, a zero crossing, a peak amplitude, and energy in a predetermined speech frame;

finding a feature map neuron within a self-organizing feature map which represents a best match between an input vector and a set of input portions of weight vectors, the feature map neuron having a unique neuron number;

outputting a vector associated with a best matched input vector in accordance with a probability of an occurrence of a phoneme;

sequentially repeating the steps of finding a best match for each of a plurality of input vectors and an associated plurality of input portions of weight vector sets and outputting the vector showing the probability of an occurrence of a phoneme;

sequentially storing the unique neuron numbers which represent the sequence of the best matched input vectors;

matching the sequential plurality of phonemes with predetermined words to determine a best matched word;

storing a sequence of phonemes capable of generating the best matched word;

sequentially combining the feature map neuron numbers with the sequence of phonemes to build a plurality of adapting vectors; and sequentially adapting the self-organizing feature map with the plurality of adapting vectors.

* * * * *